United States Patent [19]

Schmidt et al.

[11] Patent Number: 5,040,054

[45] Date of Patent: Aug. 13, 1991

[54] CIRCUIT APPARATUS FOR AUTOMATIC CORRECTION OF TV COLOR BALANCE

[75] Inventors: Dieter Schmidt, Darmstadt; Peter Bachmann, Aschaffenburg, both of Fed. Rep. of Germany

[73] Assignee: BTS Broadcast Television Systems GmbH, Darmstadt, Fed. Rep. of Germany

[21] Appl. No.: 556,127

[22] Filed: Jul. 20, 1990

[30] Foreign Application Priority Data

Jul. 22, 1989 [DE] Fed. Rep. of Germany ....... 3924336

[51] Int. Cl.$^5$ .............................................. H04N 9/73
[52] U.S. Cl. ................................................... 358/29
[58] Field of Search ........................ 358/29, 28, 40, 39

[56] References Cited

U.S. PATENT DOCUMENTS 4,035,835 7/1977 Poetsch .................................. 358/29
4,047,202 9/1977 Poetsch .

FOREIGN PATENT DOCUMENTS 62-250784 10/1987 Japan .

*Primary Examiner*—James J. Groody
*Assistant Examiner*—Kim Yen Vu
*Attorney, Agent, or Firm*—Frishauf, Holtz, Goodman & Woodward

[57] ABSTRACT

For picture elements (pixels) having a luminance value in a mid-range of luminance magnitude and a color saturation smaller than a predetermined threshold value a correction signal is obtained by integration of the color saturation value followed by multiplication by the difference between an actual luminance signal and a gradation distorted luminance signal. Threshold values at the boundaries of the mid-range of the luminance signal are determined in a manner dependent upon the extreme values that appear from time to time in the luminance signal. The stored maximum and minimum values of the luminance signals are respectively decremented and incremented at frame intervals until replaced by a new maximum or minimum value establishing a new maximum or minimum.

8 Claims, 3 Drawing Sheets

CIRCUIT APPARATUS FOR AUTOMATIC CORRECTION OF TV COLOR BALANCE

This invention for automatic TV color balance correction concerns an apparatus system in which, for picture elements (pixels) having a luminance in a middle range and a color saturation less than a predetermined threshold value, a correction signal is obtained by integration of the color saturation values and multiplication by the difference between a normal luminance signal and a gradation-distorted luminance signal.

In a known system of that kind for automatic correction of color balance, chrominance and luminance signals of a television picture are supplied through a color corrector which operates in a loop circuit as a setting unit, to the setting inputs of which there are supplied control signals derived from the corrected signal by storing of the color saturation at the time of particular luminance step levels. In that system it is provided that a color saturation value is stored only after determination of a relevant luminance step level and if at the same time the color saturation in the corrected signal was below a predetermined color saturation threshold. The details of that system are fully described in German Patent 24 48 505. This known system is distinguished by the fact that a hueless picture subject is reproduced huelessly in all luminance step ranges (gray values).

SUMMARY OF THE INVENTION

It is an object of the present invention to provide circuit apparatus for automatic correction of the color balance from signals defining chrominance and luminance of a color television picture which is improved compared to the known system in that signals with changing properties, for example with fluctuating amplitude and with varied gradation, can be corrected as optimally as possible.

Briefly, those threshold values which define the limits of the midrange of the luminance signal are automatically obtained by derivation from contemporary extreme values of the luminance signal. This can typically be done by detecting and storing the maximum value of the luminance signal, by decrementing the stored maximum value from picture to picture and, upon appearance of a new value. An upper threshold value is derived by multiplication of the currently stored maximum value by a predetermined factor, which is preferably between 0.65 and 1. In a further development of the invention, for every picture, preferably frame by frame rather than every field, the minimum value of the luminance signal is also detected and stored, the stored minimum value is raised from picture to picture and upon appearance of a minimum value that is lower than the stored minimum value the stored minimum value is replaced by the newly appearing minimum value and a lower threshold value is derived by multiplication of the currently stored minimum value with a predetermined factor, which preferably lies between 0 and 0.35.

Similarly the correction signal can be derived, instead of from the current extreme values of the luminance signal, by assuring that the course of the gradation distortion of the luminance signal is dependent upon integration results. In this case it is desirable to derive a selection signal from the integration result. The circuit for gradation distortion then selects in each case one of two or more gamma curves.

BRIEF DESCRIPTION OF THE DRAWINGS.

The invention is further described below, by way of example, with particular attention to the apparatus components connections and construction for implementing the above-described system of the invention, with reference to the annexed drawings, in which.

Figure 1:
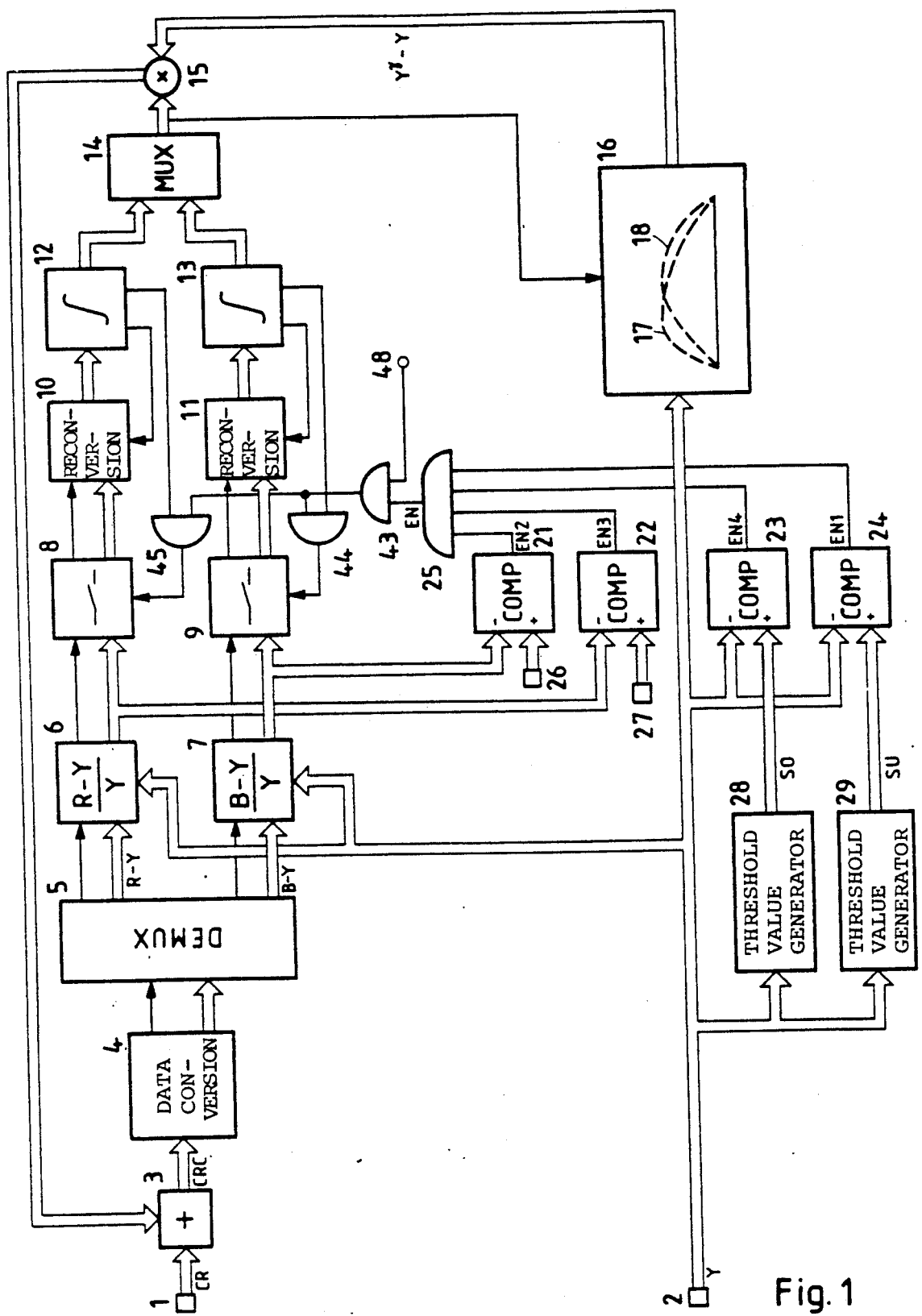
FIG. 1 is a block circuit diagram of an embodiment of the invention.

DESCRIPTION OF THE ILLUSTRATED EMBODIMENTS.

In the various figures the same parts are designated with the same reference numerals.

In FIG. 1 a digital chrominance signal CR is supplied at the terminal 1 and a digital luminance signal Y is supplied at the terminal 2. The chrominance signal contains in multiplexed form the color difference signals R-Y and B-Y and is supplied through an addition circuit 3 which operates as a correction stage. The corrected chrominance signal CRC is supplied to a circuit 4 in which it is converted from a twos complement form into a representation in terms of absolute value (magnitude) and sign.

A demultiplexer 5 is connected to the output of the circuit 4, by the help of which the two color difference signals R-Y and B-Y are derived from the corrected chrominance signal $CR_C$. In the following circuits 6 and 7 there is performed a division of the color difference signals R-Y and B-Y by the luminance signal Y supplied at the terminal 2. From that operation signals are produced which represent the color saturation in terms of separated sign and magnitude signals. Then the sign and the magnitude are respectively supplied to selectors 8 and 9. Those selectors are controlled by a signal EN of such a kind that the color saturation values are passed on to following circuits only for those pixels for which the luminance lies in a middle range and for which the color saturation is less than a predetermined threshold. The color saturation values that survive the selectors 8 and 9 and are again presented separately by sign and magnitude are supplied to the conversion circuits 10 and 11 into which they are reconverted into twos complement form.

In the following integrators 12 and 13 the reconverted color saturation signals are integrated. In this operation the respective integrators must be guided around a defined null position. For that reason, in those clock periods in which no color saturation signals are summed, negative or positive reverse integrating constants are added according to whether the integrator content is positive or negative. The magnitude of the reverse integrating constants has a decisive influence on the result of the color correction. If the reverse integrating constants are selected too small, the color correction already reacts to small surfaces with color which correspond to a colored dot and not only to the presence of color spots of large areas. This effect leads to highly visible malfunctions.

The control of the integrators around the null position and the checking whether the integrators overflow is carried out by means of read-only memories (EPROMs). The correction values from the integrator are supplied at the EPROM as input addresses. The output data produce a corresponding influencing of the integrator.

The integrated color saturation values are put together in a multiplexer 14 which produces a signal which is multiplied in a multiplier 15 by a signal Yγ-Y and is then supplied to an addition circuit 3 for correction of the chrominance signal CR. The signal Yγ-Y is derived in a circuit 16 which consists essentially of another read-only memory (EPROM) to which the chrominance signal Y is supplied as an address. Curves 17 and 18 with different gamma values are stored in the circuit 16. For selection between the curves the addresses of the read-only memory in the circuit 16 are wider by one binary place more than is necessary for the Y signal. To this extra binary place the most significant bit of the output signal of the multiplexer 14 is supplied, which represents the sign of the integrated color saturation value. In that way it is possible to fit the correction values to the course of the color density of the picture.

Figure 2:
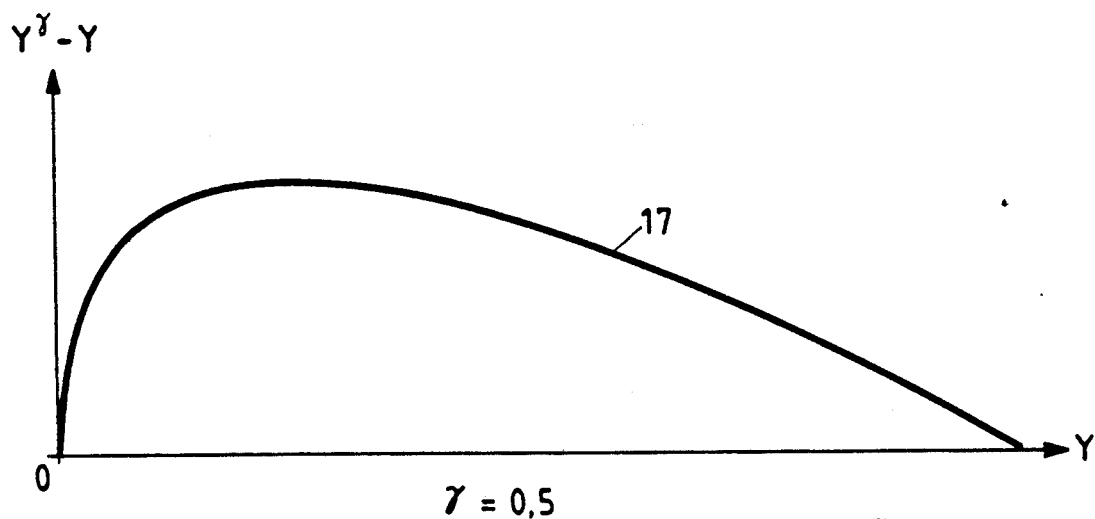
FIG. 2 is a first gamma curve used for explaining the operation of the embodiment of the invention.
Figure 3:
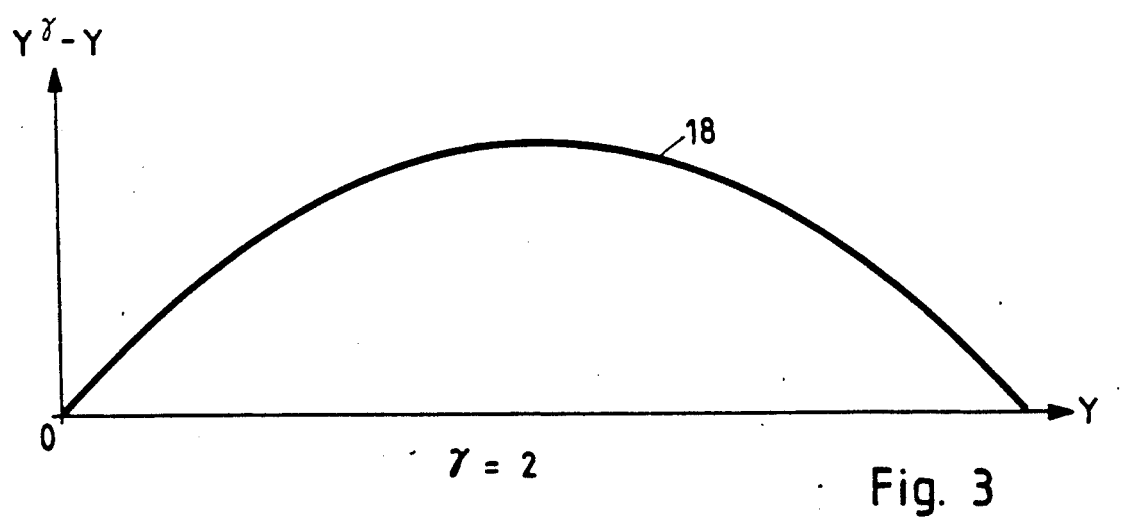
FIG. 3 is a second gamma curve for purposes similar to FIG. 2.

The curves 17 and 18 shown respectively in FIG. 2 and FIG. 3 both tend towards 0 in the neighborhood of the maximum and minimum values of luminance. In these amplitude regions, therefore, no correction is performed. In the presence of positive integrated color saturation values the curve 17 is selected, which for example has a gamma value $\gamma = 0.5$. In the case of negative integrated color saturation values, the curve 18 is brought into play. The curve 18 for example is for $\gamma = 2$. In this way any results for the usual color films and tapes, for both cases of selection, provide to a great extent the optimum correction over the entire amplitude range to be corrected. The invention is particularly useful for digital film scanning.

As already mentioned integration is carried out only for those pixel color saturation values where the color saturation lies below the prescribed or predetermined threshold and the luminance lies in a mid-range.

The signal EN controlling the selectors 8 and 9 in this manner is derived by means of the comparators 21, 22, 23 and 24 and the AND gate 25. The color saturation signals (R−Y)/Y and (B−Y)/Y are respectively supplied to the comparators 21 and 22. The respective additional inputs 26 and 27 of the comparators 21 and 22 are respectively connected to predetermined threshold values. If the currently derived color saturation signal is smaller than the threshold value, the corresponding comparator 21 or 22 provides a signal EN2 or EN3 to the AND gate 25.

The comparators 23 and 24 serve to detect a luminance signal Y in its amplitude mid-range. For that purpose the luminance signal Y is supplied to an inverting input of the comparator 23 and to a non-inverting input of the comparator 24.

For generation of the threshold values respectively dependent upon the extreme values of the luminance signal Y the circuits 28 and 29 are respectively provided. The output of the circuit 28 is connected with a non-inverting input of the comparator 23, while the output of the circuit 29 is connected to the inverting input of the comparator 24. Further details of the circuits 28 and 29 will be explained further in connection with FIG. 4 after completion of the description of FIG. 1.

The upper threshold value UT corresponds to a predetermined fraction or percentage, for example in the range from 80% to 90%, of the currently stored maximum value of the luminance signal, while the lower threshold value LT, which is derived from the circuit 29, lies similarly above the currently stored minimum value of the luminance signal Y. As a result the comparators 23 and 24 provide the value 1 respectively for their output signals EN1 and EN4 only when the luminance signal Y lies between the two threshold values. The output signal EN of the AND gate 25 accordingly has the value 1 only when the luminance signal lies within the range between the two threshold values and both color saturation signals are smaller than the corresponding threshold value.

FIGS. 2 and 3 respectively show curves 17 and 18 which are utilized according to the sign of the integrated color saturation signals. The curve shown in FIG. 2 represents $\gamma = 0.5$. The curve therefore rises up steeply in the black region and then already at about $\frac{1}{4}$ of the maximum the amplitude falls back gradually. The curve for $\gamma = 2$ shown in FIG. 3, however, has its maximum about in the middle of the amplitude range of the luminance signal.

Figure 4:
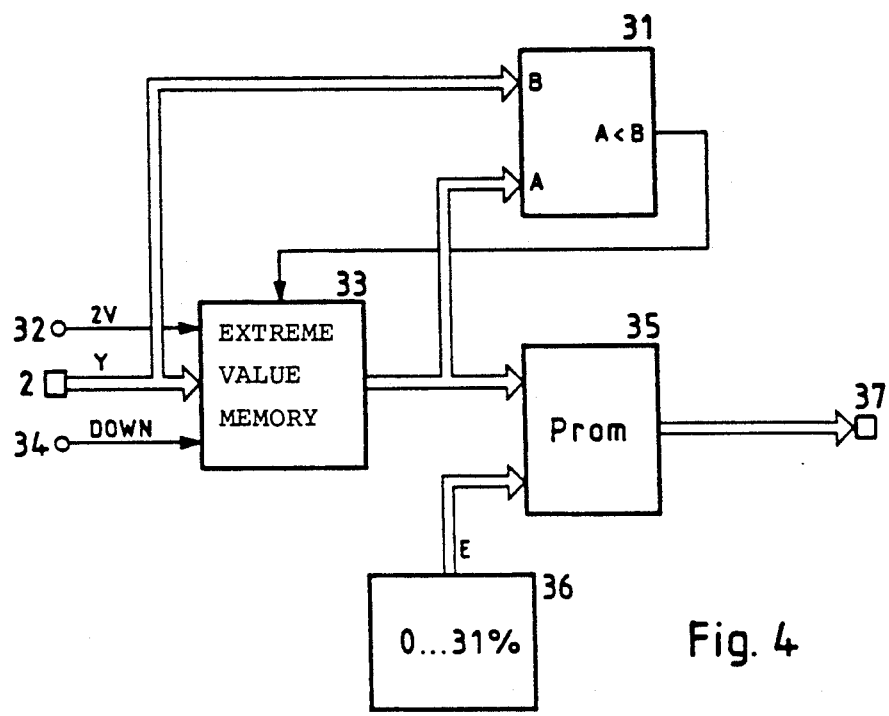
FIG. 4 is a block diagram of a circuit for deriving a threshold value out of the luminance signal.

FIG. 4 shows the circuit 28 of FIG. 1 for deriving the upper threshold value UT from the luminance signal. An input B of the comparator 31 and an input of an extreme value memory 33 are connected to the terminal 2 where the luminance signal Y is supplied. Another input A of the comparator 31 is connected to the output of the extreme value memory 33. The comparator 31 provides the signal at its output when A is smaller than B. This signal is supplied to the control input of the extreme value memory 33, which thereupon takes over the signal present at its input. The signal thus stored is diminished or raised from picture to picture by a predetermined amount. For that reason a frame pulse 2V is supplied at 32. Then by means of a signal at the input 34 it is determined whether a diminution or raising of the stored value takes place.

In the circuit 38 for deriving the upper threshold value UT a diminution takes place, whereas in the circuit 29 raising of the stored signal is produced. In this way the memory content is gradually fitted to the contemporarily present extreme value when after the occurrence of an extreme value no extreme value of equal height appears for a relatively long time. A value of the luminance signal Y that is greater than the currently stored value will be immediately taken into storage in the memory 33 under control of the comparator 31.

A threshold value is calculated by multiplication of the value in the memory 33. For this purpose a read-only memory 35 of the PROM type is used, to which the stored extreme value is supplied at one input and at another input there is a factor E obtained from the setting device 36. This factor E sets the difference between the threshold value and a corresponding ideal extreme value in the direction towards the other extreme value. If, for example, in the case of the upper threshold value a value $Y_{max}$ is stored as a percentage of the value range used by the luminance signal, then with a setting by the setting device 36 of E the following multiplication is performed: $UT = Y_{max} * (100\% - E)$. In a corresponding way the lower threshold value is calculated by the equation:

$LT = Y_{min} + (100\% - Y_{min}) * E.$

Figure 5:
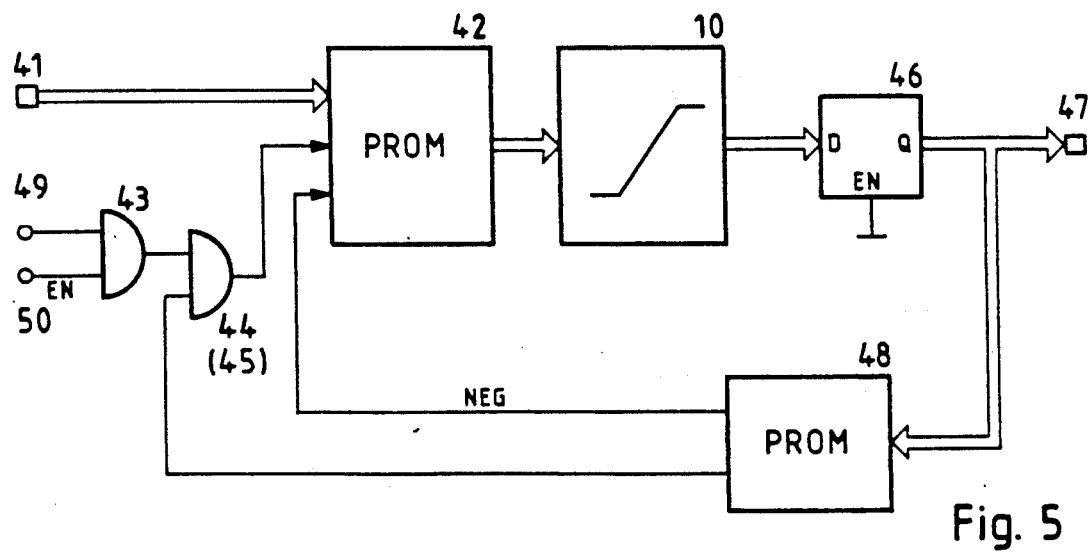
FIG. 5 is a circuit block diagram of a data conversion circuit connected to an integrator.

FIG. 5 shows a circuit which performs the functions of the circuit blocks 8, 10 and 12 or 9, 11 and 13 in FIG. 1. The color saturation signal (R−Y)/Y or (B−Y)/Y, as the case may be, is supplied over an input 41 to eight bit places of the address input of a read-only memory 42 serving as a conversion table. An additional bit place of the address input is addressed by the output of the combination of AND gates 43 and 44, or 43 and 45, as the case may be. The eight bit wide data output of the read-only memory 42 is connected with the input of the integrator 10, the output of which is connected over an eight-fold D-flipflop 46 to the output 47 of the circuit of FIG. 5.

At the output of the multiple D-flipflop 46 there is also connected a logic circuit 48 likewise provided in the form of a read-only memory. The outputs of the logic circuit 48 supply signals NEG and RANGE which are supplied respectively to an additional binary place of the address input of the read-only memory 42 and to an input of the AND gate 44 or 45 as the case may be. The signal NEG depends upon the sign of the integrator content, while the signal RANGE designates when the integrated content hits the limits of the operating range of the integrator.

Integrated circuits are in themselves known, so that it is not necessary to explain the integrator 10 in detail. In a practical implementation of the circuit apparatus of the invention the integrator would be composed of six feedback-coupled summing circuits. This large number prevents an overflow of the integrator or instability of the control system in the case of large color errors. Along with the conversion of the color saturation data from a sign and magnitude representation into a twos complement representation, the read-only memory 42 has the function of making possible a reverse integration during those time intervals in which the signal EN has the value 0. This, furthermore, takes place when the correction operation is switched off, in order that at the beginning of any correction operation the integrator will always be in a defined null state. For this purpose the signals ON/OUT and EN are supplied respectively over the inputs 49 and 50 of the AND gate 43, the output signal of which is correlated in an additional AND gate 44 or 45, as the case may be, with a RANGE signal. The integrator thus does not remain steadily at an integration value once reached if no new color saturation values get into the integration. The magnitude of the reverse integration is decisive for a correct activation of the correction, but as explained herein, it can readily be determined or fixed for a particular apparatus by a person skilled in the art. With a correct reverse integration a small number of color saturation values cancel each other out. If the magnitude of the reverse integration is chosen too small, the correction will react even to small areas with colors which correspond to a color spot and not only to relatively large area color spots. That leads to strong visible malfunctions. According to the sign of the integrator content a negative or a positive value is to be added. For that purpose the signal NEG corresponding to the sign is supplied by the logic circuit 48 to an additional bit place of the address input of the read-only memory 42. After modification in accordance with the table stored in the read-only memory 42 the data proceed from the output from the read-only memory 4 to the input of the integrator.

If the maximum producible correction value produced by the above regulation is not sufficient, the integrator must not integrate beyond its maximum or minimum value. The correction would soon jump continually between the positive and negative maximum value. For this reason further integration upon reaching the maximum or minimum value is prevented by the RANGE signal. When that happens there remains a residue of uncorrectable color spots.

Although the invention has been described with reference to a particular illustrative embodiment, it will be understood that modifications and variations are possible within the inventive concept.

What is claimed is:

1. A circuit apparatus for automatic correction of the color balance of a digital color television signal representing a sequence of immediately successive television pictures, said apparatus having means for deriving color saturation values as the ratio of a color difference signal value to a luminance signal value, means for selecting from said color saturation values only those of said values which are contemporary with luminance signal values lying in a luminance value mid-range and are less than a predetermined threshold value for color saturation value, means for integrating said selected saturation values to produce integrated saturation values, means for multiplying said integrated saturation values by the difference in value between an unmodified luminance signal value and a luminance signal value modified by a gradation-characteristic change to produce a color correction signal, and further comprising:

means for determining at least a variable upper limit of said luminance value mid-range by continually deriving upper mid-range threshold values from a sequence of peak luminance values occurring in each of a sequence of television pictures which does not include all of said immediately successive television pictures.

2. The circuit apparatus of claim 1, wherein said means for determining at least a variable upper limit of said luminance value mid-range comprises means for detecting said peak luminance values and storing them in a memory, means for decrementing said stored peak luminance values at inter-picture intervals and means for replacing a stored peak luminance value only when a peak luminance value is detected which is greater than the stored luminance value, and wherein said means for determining said variable upper limit of said luminance value mid-range includes means for multiplying said peak luminance value which is contemporarily stored by a predetermined factor not greater than unity, and thereby to produce a threshold value which determines said variable upper limit of said luminance value mid-range.

3. The circuit apparatus of claim 2, wherein said predetermined factor is in the range between about 0.65 and unity.

4. The circuit apparatus of claim 1, further comprising means for detecting a variable lower limit of said luminance value mid-range by continually deriving a lower mid-range threshold value from a sequence of minimum luminance values occurring in each of a sequence of television pictures which does not include all of said immediately successive television pictures, and wherein said means for determining said variable lower limit of said luminance value mid-range includes means for detecting said minimum luminance values and storing them in a memory, means for incrementing said stored minimum luminance values at inter-picture intervals and means for replacing a stored minimum luminance value only when a minimum luminance value is detected which is less than said stored minimum luminance value, and wherein means are provided for multiplying said stored minimum luminance value which is contemporaneously stored by a predetermined factor to produce a threshold value which determines said variable lower limit of said luminance value mid-range.

5. The circuit apparatus of claim 4, wherein said predetermined factor is in the range from 0 to about 0.35.

6. A circuit apparatus for automatic correction of the color balance of a digital color television signal representing a sequence of immediately successive television pictures, said apparatus having means for deriving color saturation values as ratio of a color difference signal value to a luminance signal value, means for selecting from said color saturation values only those of said values which are contemporary with luminance signal values lying in a luminance value mid-range and are less than a predetermined threshold value for color saturation values, means for integrating said selected saturation values to produce integrated saturation values, means for multiplying said integrated saturation values by the difference in value between an unmodified luminance signal value and a luminance signal value modified by a gradation-characteristic change to produce a color correction signal, and further comprising:

means for controlling the provision of said modified luminance signal values in a manner dependent upon an output of said means for integrating said saturated values to produce integrated saturation values.

7. The circuit apparatus of claim 6, wherein said output of said integrating means for controlling the gradation-characteristic change, by which said luminance signal values are modified, is an output at which a selection signal derived from said integrated saturation values is provided, and means are also provided for luminance signal modification by a gradation-characteristic change by means of plurality of stored characteristic gradation curves selectable by said selection signal.

8. The circuit apparatus of claim 7, wherein said selection signal produced at said output of said integrating means represents the sign of the integration result produced in said integrating means and wherein means are provided for modifying said luminance signal by a gradation characteristic change by producing gradation distortion of said unmodified luminance signal values in which the gradation distortion gamma is either less than 1 or more than 1 according to the sign of the integration result provided at said selection signal output.

* * * * *